(12) United States Patent
Braun et al.

(10) Patent No.: US 6,840,497 B2
(45) Date of Patent: Jan. 11, 2005

(54) ELECTROMAGNET FOR ACTUATING A HYDRAULIC VALVE

(75) Inventors: Jerg Braun, Stuttgart (DE); Hermann Sanzenbacher, Schwieberdingen (DE)

(73) Assignee: Bosch Rexroth AG, Stuttgart (DE)

( * ) Notice: Subject to any disclaimer, the term of this patent is extended or adjusted under 35 U.S.C. 154(b) by 15 days.

(21) Appl. No.: 10/466,219

(22) PCT Filed: Mar. 15, 2002

(86) PCT No.: PCT/DE02/00928

§ 371 (c)(1),
(2), (4) Date: Jul. 14, 2003

(87) PCT Pub. No.: WO02/077506

PCT Pub. Date: Oct. 3, 2002

(65) Prior Publication Data

US 2004/0075071 A1 Apr. 22, 2004

(30) Foreign Application Priority Data

Mar. 24, 2001 (DE) .......................................... 101 14 472

(51) Int. Cl.$^7$ .............................................. F16K 31/02
(52) U.S. Cl. ................... 251/129.03; 335/258; 335/262
(58) Field of Search ............................ 251/129.03, 14, 251/129.15; 335/258, 262

(56) References Cited

U.S. PATENT DOCUMENTS 3,977,649 A    8/1976 Zeuner et al.
4,679,017 A  * 7/1987 Mishler et al. ........ 251/129.03
5,451,030 A    9/1995 Reglebrugge et al.

FOREIGN PATENT DOCUMENTS

| DE | 26 60 860 C2 | 5/1985 |
|---|---|---|
| DE | 37 23 747 A1 | 2/1988 |
| DE | 37 23 747 A | 2/1988 |
| DE | 42 15 237 A | 11/1993 |
| DE | 100 06 784 A | 8/2001 |

OTHER PUBLICATIONS

Patent Abstracts of Japan VO. 1999, No. 09, Jul. 30, 1999 & JP 11 101361 A, Apr. 13, 1999.
Patent Abstratcs of Japan vol. 011, No. 172, Jun. 3, 1987 & JP 62 004979 A, Lanuary 10, 1987.
Patane Abstratcs of Japan vol. 1998, No. 03, Feb. 27, 1998 & JP 09 292049 A, Nov. 11, 1997.

* cited by examiner

*Primary Examiner*—John Bastianelli
(74) *Attorney, Agent, or Firm*—Michael J. Striker

(57) ABSTRACT

An electromagnet (10) for actuating a hydraulic on-off valve (11), has a wet-type configuration and its armature (31) is displaced in a pressure pipe (18) when a volume of oil is switched through a throttling site (35) in such a way that switching speed can be influenced. The electromagnet (10) has a manual emergency actuation device (43) in the pressure pipe (18). If necessary, the actuating bolts (44) of said device can be engaged with a throttle screw (39) by an interlocking connection (45, 42) in order to displace said throttle screw that is arranged in the armature (31). The switching speed of the distributing valve (11) can be easily regulated from the outside when the electromagnets (10) are mounted, without impairing functioning of the manual emergency actuation device.

14 Claims, 2 Drawing Sheets

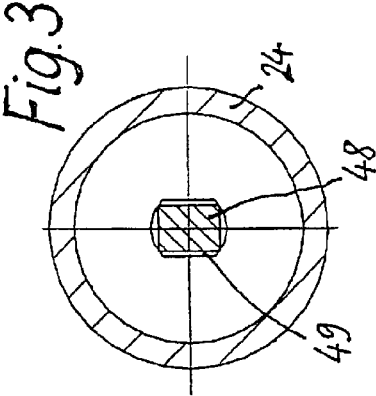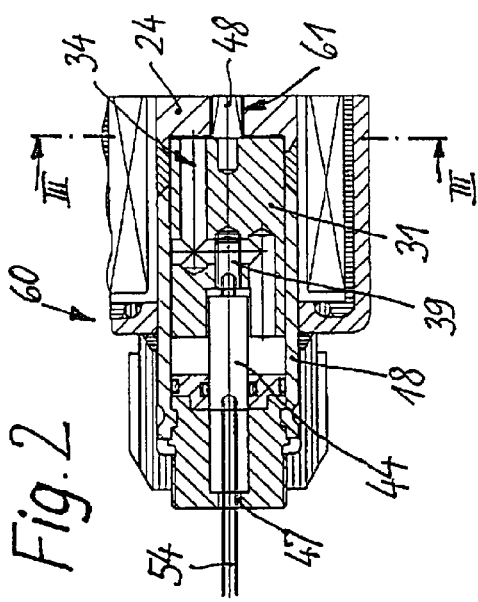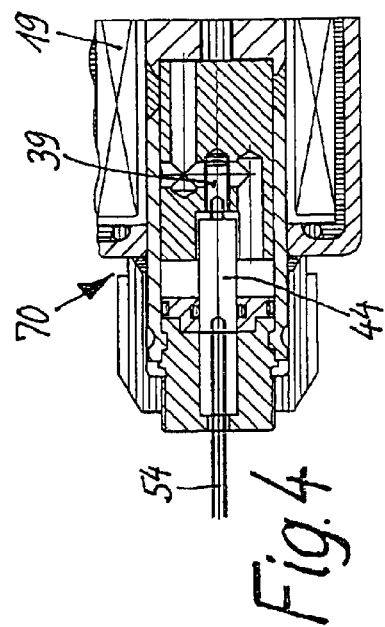

US 6,840,497 B2

ELECTROMAGNET FOR ACTUATING A HYDRAULIC VALVE

BACKGROUND OF THE INVENTION

The invention is based on an electromagnet for actuating a hydraulic valve.

An electromagnet of this type for actuating a hydraulic valve was made known in DE 37 23 747 A1, which said electromagnet is designed as a single-action magnet having a pressure-tight configuration. The armature is situated in a longitudinally displaceable manner in a pressure tube filled with a pressure medium, on the outside of which said pressure tube the coil and the magnet housing are situated. In addition, a manual emergency actuation device is provided on the electromagnet, the actuating bolt of which can be actuated by hand from the outside in case of emergency or during set-up, and, when the magnet is not energized, said actuating bolt can actuate the armature and/or the valve spool by means of its section extending into the pressure tube. In order to attain a desired reduction of switching speed with distributing valves of this type and, therefore, to prevent impacts that occur during switching, a throttle is installed in the armature of the electromagnet. Said throttle is installed in a passageway in the solenoid armature, through which oil moves between the two chambers located at the ends of the armature when said armature switches. Said transfer of oil decelerates the armature motions in both directions. In combination with an adapted valve spool in the distributing valve, said armature motions are referred to as "soft-switching". Magnets of this type are connected with the valve part in a pressure-tight manner. As a result, the solenoid armature is housed in a closed space of the "pressure tube" and is unaccessible after assembly. The diameter of the throttle must be specified before the pressure tube is closed, which means that a multitude of different valve variants and/or electromagnets results. The disadvantage of this is the fact that a customer can only order a valve having a specified throttle diameter, and he does not know if the installed throttle meets the desired requirements until a machine is operated. If changes are desired, it is often necessary to replace the entire valve and the installed electromagnet.

Furthermore, a solenoid valve is made known in DE 26 60 860 C2, on whose electromagnet a hydraulic cartridge for damping switching motions is mounted externally of the magnet housing as an extension of the pressure pipe. Although the damping can be adjusted here using a throttle screw in the hydraulic cartridge that is accessible from the outside after the electromagnet and/or the solenoid valve are installed on a machine, the electromagnet with hydraulic cartridge is extremely costly to build with an additional piston-cylinder unit with spring and a rolling membrane for delimiting the space filled with hydraulic fluid, making it unusable in many cases for reasons of cost and space. In addition, a manual emergency actuation device for the electromagnet is not included.

SUMMARY OF THE INVENTION

In contrast, the electromagnet according to the invention for actuating a hydraulic valve has the advantage that it comprises a throttling site that can be adjusted from the outside even after it is installed on a valve, making it possible to subsequently adapt the electromagnet to desired switching speeds without having to remove it. The throttling effect can then be adjusted for fine-tuning directly on the machine on which the distributing valve is mounted. It is also possible to compensate for hydraulic tolerances between individual machines. The adjustable throttling site installed in the armature can therefore be adjusted easily from the outside on the mounted valve. The electromagnet makes a simple, compact and economical configuration possible, and previous parts can be used further without significant changes. Since the throttling site is adjustable, the stockpiles of distributing valves of this type can be reduced, and adjusting effort is minimal. Furthermore, the function of the manual emergency actuation device is retained, and the two functions of manual emergency actuation and adjustment of switching speed can be integrated in the electromagnet in favorable fashion.

BRIEF DESCRIPTION OF THE DRAWINGS

FIG. 2 is a longitudinal sectional drawing through a part of a second exemplary embodiment of an electromagnet with another anti-rotation element.

FIG. 3 is a partial sectional drawing through the line III—III in FIG. 2 shown as an enlargement.

FIG. 4 is a longitudinal sectional drawing of part of a third exemplary embodiment of an electromagnet.

DESCRIPTION OF THE PREFERRED EMBODIMENTS

Figure 1:
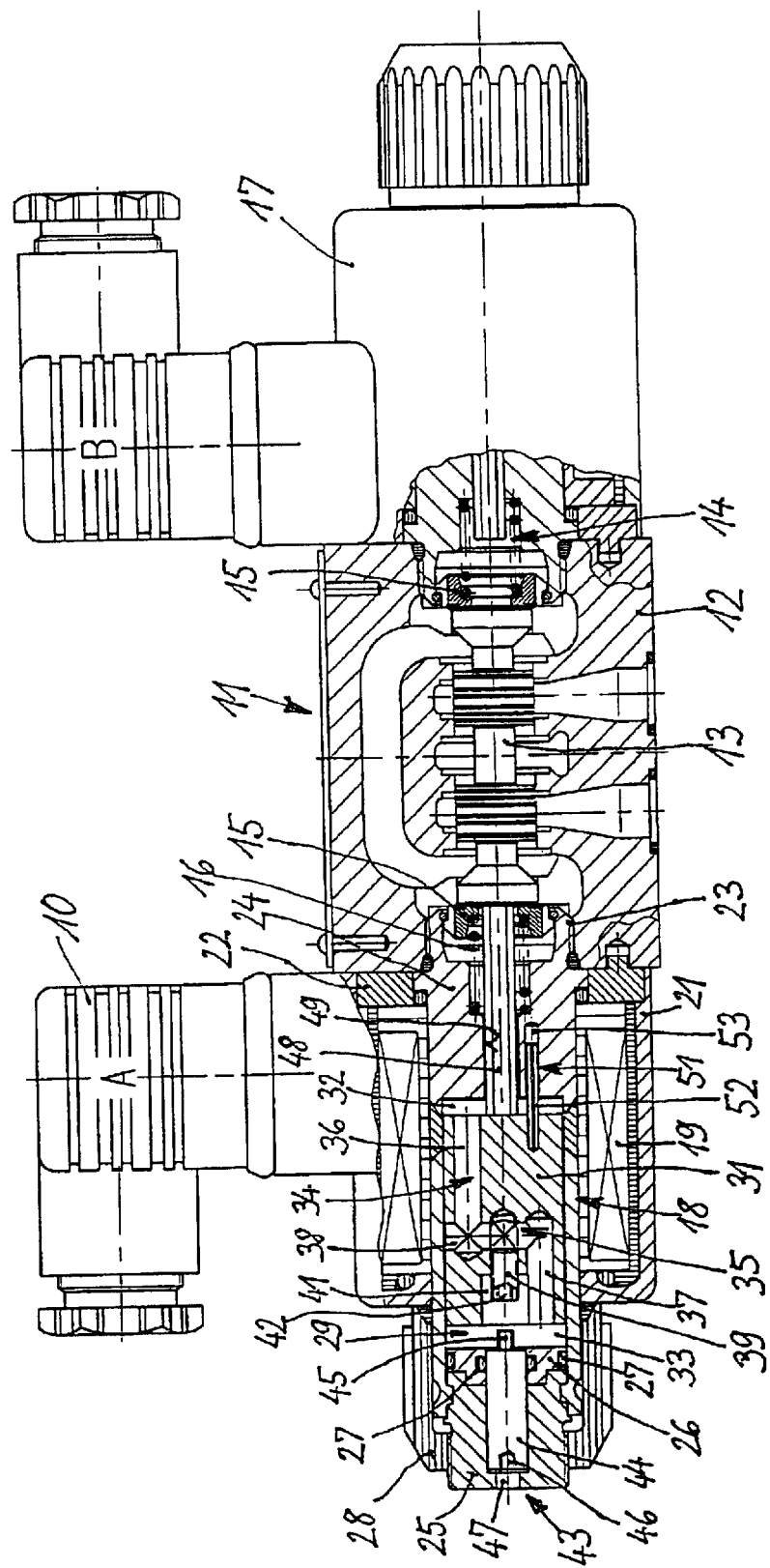
FIG. 1 is a simplified longitudinal sectional drawing of a first exemplary embodiment of an electromagnet mounted on a hydraulic 4/3 valve.

FIG. 1 shows a simplified longitudinal sectional drawing through an electromagnet 10 for actuating a hydraulic valve that is designed here as a standard 4/3-distributing valve 11. The distributing valve 11 accommodates a valve spool 13 in a valve housing 12, which said valve spool is centered in the central position shown in the drawing by means of a double-acting return mechanism 14 with spring seats 15 and return springs 16. From said central position, the valve spool 13 can be deflected to either side into working positions, and a second electromagnet 17 having an identical configuration is located on the valve housing 12 for this purpose.

The electromagnet 10 is configured as a single-acting tractive solenoid having a pressure-tight configuration. For this purpose, it comprises a pressure pipe 18, on the outside of which a coil 19 and a magnet housing 21 having a coupler ring 22 are located. The pressure pipe 18 comprises a sleeve-shaped pole piece 24, on the free end of which a central thread 23 is located. The pressure pipe 18 is screwed into the valve housing 12 in a sealed and fixed manner by means of this central thread 23. At its other end, the pressure pipe 18 is closed by means of a guide sleeve 25 that is situated in the pressure pipe 18 in a fixed and non-detachable manner, and in front of which a sealing disk 26 with sealing rings 27 is situated. A ring nut 28 is screwed onto an outside thread of the guide sleeve 25, which said ring nut presses the valve housing 12—together with the coil 19 and the coupler ring 22—against the end face of the valve housing 12.

A longitudinally displaceable armature 31 of the electromagnet 10 is supported in the interior space 29 in the pressure pipe 18 remaining between the sealing disk 26 and the pole piece 24. In the central position of the valve spool 13 shown in the drawing, said interior space 29 is divided by the armature 31 into a first pressure chamber 32 on the valve side, and a second, rearward pressure chamber 33. The two pressure chambers 32 and 33 are interconnected via a passageway 34 that extends directly in the armature 31, and into which an adjustable throttling site 35 engages. The passageway 34 comprises two eccentrically arranged blind-hole bores 36 and 37 that extend parallel to each other, the first of which (36) is connected with the first pressure chamber 32, while the second blind-hole bore 37 opens into the second pressure chamber 33. The ends of the two blind-hole bores 36 and 37 are interconnected by means of a third blind-hole bore 38 that extends in the armature 31 radially to its longitudinal axis. The third blind-hole bore 38 extending coaxially to the longitudinal axis accommodates a throttle screw 39 that serves as part of the adjustable throttling site 35. Said throttle screw 39 extends with its free end into a pot-shaped recess 41 in the armature 31, and it comprises a coaxially arranged internal hexagon 42 as key surface on its free end. The radial opening of the third blind-hole bore 38 is sealed off in advantageous fashion by the inner wall of the pressure pipe 18.

A manual emergency actuation device 43 of the electromagnet 10 is located on the end of the pressure pipe 18 opposite the central thread 23. For this purpose, an actuating bolt 44 is supported centrally in the guide sleeve 25, which said actuating bolt—with the aid of the sealing rings 17—seals off the interior space 29 in the pressure pipe 18 from the outside. An outer hexagon 45, as key surface, is located centrally on the end of the actuating bolt 44 pointing toward the interior space 29, which said outer hexagon is located coaxially relative to the internal hexagon 42 in the throttle screw 39, and which can engage in said internal hexagon with an interlocking connection in order to transmit torque. The actuating bolt 44 is configured and arranged in such a manner that it is axially displaceable and turnably supported. Its length is designed such that it ensures that the interior space 29 is sealed off in any axial position. On its end opposite the outer hexagon 45, the actuating bolt 44 also comprises an internal hexagon 46 that also serves as key surface and is accessible from the outside through an axial opening 47 in the guide sleeve 25 using a suitable tool or key.

The axial travel of the armature 31 is transmitted via a pushrod 48 to the valve spool 13. The pushrod 48 is secured in the armature 31 and bears against it when the valve spool 13 is in the central position shown in the drawing. The pushrod 48 is guided in the pole piece 24 in a longitudinal bore 49 through which pressure medium from the return side in the valve housing 12 can also enter the interior space 29 of the pressure pipe 18.

Furthermore, an anti-rotation element 51 for the armature 31 is located in the electromagnet 10. For this purpose, a pin 52 situated in a fixed manner in the armature 31 engages in an associated bore 53 in the pole piece 24, so that the armature 31 can move axially, but it cannot turn in the circumferential direction. The pin 52 is composed of magnetically non-conductive material.

The mode of functioning of the electromagnet 10 in combination with the associated 4/3-distributing valve 11 shall be explained hereinbelow, whereby it is assumed that the basic function of a distributing valve of this type having electromagnetic actuation is known.

When the electromagnet 10 or 17 is not energized, the valve spool 13 in the valve housing 12 is centered in the central position shown in the drawing by means of the double-acting return mechanism 14. The armature 18 in the electromagnet 10 also assumes the position shown in the drawing, in which it rests against the valve spool 13 by means of its pushrod 48. The actuating bolt 44 is usually held in the end position shown by means of pressure in the interior space 29—which is usually the return pressure—by stopping at the guide sleeve 25, whereby its outer hexagon 45 is not engaged with the internal hexagon 42 on the throttle screw 39, but instead is located at a slight distance from it.

If the electromagnet 10 is now energized—whereby the second electromagnet 17 is switched off—the armature 31 in the pressure pipe 18 moves inward toward the distributing valve 11, whereby its pushrod 48 displaces the valve spool 13 against the force of the return mechanism 14 to the right as viewed in FIG. 1. When the armature 31 travels axially in this manner, it must displace pressure medium out of the first pressure chamber 32, which said pressure medium must escape to the second pressure chamber 33 via the passageway 34 in the armature 31. Depending on the setting of the throttle screw 39, the adjustable throttle site 35 brings about a more or less strong restriction of this oil-exchange flow, which also brings about a reduction in the switching speed and, therefore, prevents impacts that occur during switching. When the electromagnet 10 is switched off, the valve spool 13 is pushed back into the central position by a return spring 16 of the double-acting return mechanism 14, whereby pressure medium is now displaced in the reverse direction from the second pressure chamber 33 through the passageway 34 with its throttling site 35 and into the first pressure chamber 32.

If, during operation of an installed distributing valve 11, it has been shown that the switching speed is too great when the electromagnet 10 is switched on, said switching speed can be reduced without considerable effort with the aid of the adjustable throttle site 35. To accomplish this, a tool 54—as shown in FIG. 2, for example—is inserted through the opening 47 into the internal hexagon 46 of the actuating bolt 44. The actuating bolt 44 is then pressed inward with the aid of the tool 54, whereby its outer hexagon 45 engages in the internal hexagon 42 of the throttle screw 39, and an interlocking connection is established. By turning the tool 54, the throttle screw 39 can now be adjusted so that a desired restriction and, therefore, a reduction in the switching speed, can be attained. The anti-rotation element 51 prevents the armature 31 from turning. This adjustment of the throttle screw 39 can also be carried out when the electromagnet 10 is switched when the armature 31 assumes its end position on the right, so that it can no longer move in the axial direction when the actuating bolt 44 is guided axially into the throttle screw 39. When the tool 54 is removed, the actuating bolt 44 is automatically returned to the home position shown in the drawing, where it is held by means of pressure acting on it on one side in the interior space 29, i.e., the return pressure. In this fashion, fine-tuning can be carried out directly on the machine with the aid of the throttle site 35 that can be adjusted from the outside, without having to separate the electromagnet 10 from the distributing valve 11. This also makes it possible to deal with hydraulic tolerances between individual machines and offset them.

Independent of this possibility for preventing impacts that occur during switching with the aid of the throttle site 35 that can be adjusted from the outside, the function of manual emergency actuation remains unchanged. If service failures occur, the actuating bolt 44 can still be actuated manually using a tool so that the valve spool can be displaced without energizing the coil (e.g., during set-up). An identical manual emergency actuation device is available on the other electromagnet 17.

If the valve spool 13 is moved to the left out of its neutral position when the second electromagnet 17 is switched, the pushrod 48 also pushes the armature 31 to the left into the second pressure chamber 33; the axial distance between the key surfaces 42 and 45 is designed to be so great that they do not engage and do not interfere with this switching motion.

FIG. 2 shows a second exemplary embodiment of a second electromagnet 60, only one part of which is shown in a longitudinal sectional view. The second electromagnet 60 differs from the first electromagnet 10 in FIG. 1 as follows, whereby the same reference numerals are used for identical components. The second electromagnet 60 differs primarily by the fact that it comprises another anti-rotation element 61 for the armature 31, the configuration of which is shown in greater detail in FIG. 3. FIG. 3 shows an enlarged view of a cross-section through the pressure pipe 18 along the line III—III in FIG. 2. For the anti-rotation element 61, the pushrod 48 has a rectangular cross-section, while the associated longitudinal bore 49 is configured as a matching profile bore instead of having the circular cross-section. The position of the armature 31 with the electromagnet 60 switched is now shown in FIG. 2, whereby its end face rests against the pole piece 24. Furthermore, the tool 54 is inserted through the opening 47 and into the actuating bolt 44, which said actuating bolt is engaged in an interlocking manner with the throttle screw 39. The throttle screw 39 is screwed in completely, so that a maximum restriction in the adjustable throttle site 35 is attained. The throttle 28 screw 39 is equipped with a suitable plastic coating for self-retention.

FIG. 4 shows, as a third exemplary embodiment, a longitudinal sectional drawing through a part of a third electromagnet 70 that differs from the first electromagnet 10 in FIG. 1 by the fact that an anti-rotation element is eliminated entirely. To adjust the throttle screw 39, the electromagnet 70 is switched on, so that the armature 31 is held in its end position by magnetic forces, which allows the throttle screw 39 to be turned. Instead of an anti-rotation element, the armature 31 is now held by means of a frictional connection so that a desired setting can be implemented.

Changes can be made to the exemplary embodiments shown, of course, without deviating from the idea of the invention. Although the means of attaining the object of the invention described herein that comprise a combination of changeable switching speed and manual emergency actuation is particularly advantageous in the case of the switching valve shown, this means of attaining the object of the invention can also be used with other valves that work with an electromagnet having a wet-type configuration, in which oil is displaced in the region of the armature. The electromagnet can also be used to actuate poppet valves. Said means of attaining the object of the invention can also be used when, instead of the electromagnets 10 and 17 shown, a single double-tractive solenoid is used that is preferably equipped with a manual emergency actuation device. Although the embodiment shown having internal and external hexagon is particularly advantageous, the interlocking connection between the deblocking piston 44 and the throttle screw 39 can also be established using other key surfaces. Instead of the preferred throttle screw 39, another adjustable throttle member can be used, e.g., a sleeve with a transverse bore that is turnably supported in the armature. The anti-rotation element can also be changed in terms of many different designs, or it can be eliminated entirely. In addition, an additional non-return valve for rapidly resetting the armature 31 can be installed, if necessary, in a manner known per se, so that the function of a throttle non-return valve can be integrated in the armature 31. Further changes are possible without deviating from the idea of the invention. Instead of blind-hole bores in the armature, through holes that are closed on one side can be used as well.

What is claimed is:

1. An electromagnet for actuating a hydraulic valve, comprising a magnet housing and a coil that are disposed on a pressure pipe that has an armature guided longitudinally in its interior space acted upon by a pressure medium, said armature comprising a passage with a throttling site that influences the switching speed to exchange oil between two adjacent passageways of the armature, and comprising a manual emergency actuation device for the electromagnet, for the purposes of which an outwardly projecting, sealed actuating bolt extends into the interior space of the pressure pipe and is capable of engaging with the armature, wherein the throttling site (35) in the armature (31) has an adjustable throttle member (39) that can be regulated from the outside using the actuating bolt (44).

2. The electromagnet according to claim 1, wherein the throttle member in the armature (31) is configured as a throttle screw (39) that is capable of being displaced by the actuating bolt (44) and projects into the passageway (34).

3. The electromagnet according to claim 1, wherein the throttle member (39) in the armature (31) and the actuating bolt (44) are arranged coaxially relative to each other in the pressure pipe (18).

4. The electromagnet according to claim 1, wherein the passageway (34) in the armature (31) is formed by two parallel, eccentrically arranged blind-hole bores (36, 37) that are open toward opposed end faces (32, 33) of the armature (31), said blind-hole bores being interconnected by a third, radial blind-hole bore (38), into which said third blind-hole bore (38) the centrally located throttle member (39) engages.

5. The electromagnet according to claim 1, wherein the actuating bolt (44) is supported in the pressure pipe (18) in a manner that is longitudinally displaceable, sealed and turnable and, in particular, is held in its end position by a stop (25) that is integral with the housing.

6. The electromagnet according to claim 1, wherein the actuating bolt (44) and the throttle member (39) comprise, on their facing ends, suitable key surfaces (45, 42) that enable an interlocking connection for transmitting a rotary motion.

7. The electromagnet according to claim 6, wherein the key surfaces are configured as matching internal hexagon (42) and external hexagon (45) that are capable of engaging in each other.

8. The electromagnet according to claim 1, wherein the actuating bolt (44) comprises a key surface (46) on its outwardly pointing end, that is accessible from the outside through an opening (47) in the pressure pipe (18), said opening being integral with the housing.

9. The electromagnet according to claim 1, wherein an anti-rotation element (51) is associated with the armature (31), that is configured as an eccentrically arranged bore (53) and a pin (52) gliding therein.

10. The electromagnet according to claim 9, wherein the anti-rotation element (61) is formed on the armature pushrod (48) leading to the valve spool (13) of the distributing valve (11), which said armature pushrod is guided in the magnet housing (21) in rotation-proof fashion.

11. The electromagnet according to claim 1, wherein it is configured as a single-action tractive solenoid.

12. The electromagnet according to claim 1, wherein a distributing valve (11) having a longitudinal slide (13) is used as the valve, which said longitudinal slide is capable of being actuated by two single-action switching solenoids (10, 17).

13. The electromagnet according to claim 1, wherein, the throttle member (39) can be adjusted with the magnet (10) energized and with the armature (31) located in the end position and held against rotation with non-positive engagement.

14. The electromagnet according to claim 1, wherein it is configured as part of a double-tractive solenoid drive.

* * * * *